US011962392B2

(12) United States Patent
Zavesky et al.

(10) Patent No.: US 11,962,392 B2
(45) Date of Patent: Apr. 16, 2024

(54) SYNCHRONIZED SATELLITE COMMUNICATIONS

(71) Applicant: AT&T Intellectual Property I, L.P., Atlanta, GA (US)

(72) Inventors: Eric Zavesky, Austin, TX (US); James Pratt, Round Rock, TX (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 414 days.

(21) Appl. No.: 17/243,796

(22) Filed: Apr. 29, 2021

(65) Prior Publication Data

US 2022/0352976 A1 Nov. 3, 2022

(51) Int. Cl.
*H04W 84/06* (2009.01)
*H04B 7/185* (2006.01)
(52) U.S. Cl.
CPC ..... *H04B 7/18508* (2013.01); *H04B 7/18513* (2013.01); *H04B 7/18515* (2013.01)

(58) Field of Classification Search
None
See application file for complete search history.

(56) References Cited

U.S. PATENT DOCUMENTS

2020/0068481 A1* 2/2020 Kim ................. H04W 8/08

* cited by examiner

*Primary Examiner* — Willie J Daniel, Jr.
(74) *Attorney, Agent, or Firm* — Guntin & Gust, PLC; Robert Gingher

(57) ABSTRACT

Synchronized satellite communications can include receiving, at a computer having a processor, a data request that identifies a requesting device, data to be received by the requesting device, and a time at which the data is to be received by the requesting device. The processor can determine a geographic location of the requesting device and locations of a plurality of satellites; identify, based on the geographic location of the requesting device and the locations of the plurality of satellites, satellites that are to provide the data to the requesting device; generate instructions for loading network requirements to the satellites; and provide, to at least one of the satellites, the instructions. Additionally, embodiments of the concepts and technologies disclosed herein can be used to provide the same data and/or different data to multiple devices at the same time.

20 Claims, 7 Drawing Sheets

SYNCHRONIZED SATELLITE COMMUNICATIONS

BACKGROUND

Providing network connectivity to users using satellites can present challenges. Satellites may have multiple modes of orbital patterns that can disrupt ground connections, as well as space-based radio connections. For example, some satellites may move in and out of radio range quickly. Similarly, satellites may encounter atmospheric and space-based interferences that may disrupt network connections.

SUMMARY

The present disclosure is directed to synchronized satellite communications. A user device can request data from satellites and/or a synchronized satellite communication service. In some embodiments, the user device can send, to the synchronized satellite communication service and/or to one or more of the satellites, a request for the data, for example a data request. In some embodiments, the data request can identify the data that is being requested by the user device, an identity and/or address of the user device, a location of the user device, a time at which or over which delivery of the data is being requested, combinations thereof, or the like. In some embodiments of the concepts and technologies disclosed herein, a satellite that receives the data request can forward, to the synchronized satellite communication service, a request that can provide some or all information in the data request to the synchronized satellite communication service. It should be understood that this example is illustrative, and therefore should not be construed as being limiting in any way.

The synchronized satellite communication service can be configured to determine, based on information in the data request and/or the request, the data that is to be delivered to the requesting device (e.g., the user device) and the time the data is to be provided to the user device. The synchronized satellite communication service also can be configured to determine a location of the user device and locations of one or more of the satellites at a current time and/or a future time if delivery of the data was requested at a future time. The synchronized satellite communication service also can be configured to determine a number of satellites that are to provide the data to the user device based, for example, on an amount of data being transferred, time constraints set for the data transmission, bandwidth limitations of the satellites, combinations thereof, or the like.

Based on the locations of the user device and the satellites, and based on the bandwidth needs and requirements, the synchronized satellite communication service can identify the satellites that are to provide the data to the user device. The synchronized satellite communication service can be configured to generate instructions to load the network requirements to the identified satellites, e.g., to send the instructions to the satellites to orchestrate and/or otherwise activate communication channels with the satellites. The instructions also can instruct the satellites how to divide the data among the satellites, and how the satellites will synchronize transmission of the resulting data portions to the user device so that the user device can assemble the data portions into the data. Additionally, embodiments of the concepts and technologies disclosed herein can be used to provide the same data and/or different data to multiple devices at the same time. These and other aspects of the concepts and technologies disclosed herein will be illustrated and described herein in more detail.

According to one aspect of the concepts and technologies disclosed herein, a system is disclosed. The system can include a processor and a memory. The memory can store computer-executable instructions that, when executed by the processor, cause the processor to perform operations. The operations can include receiving a data request that can identify a requesting device, data to be received by the requesting device, and a time at which the data is to be received by the requesting device; determining a geographic location of the requesting device and locations of two or more satellites; identifying, based on the geographic location of the requesting device and the locations of the two or more satellites, satellites that are to provide the data to the requesting device; generating instructions for loading network requirements to the satellites; and providing, to at least one of the satellites, the instructions.

In some embodiments, the computer-executable instructions, when executed by the processor, can cause the processor to perform operations that further can include determining if changes should be made to the satellites that are to provide the data to the requesting device; and in response to a determination that the changes should be made, updating the geographic location of the requesting device and the locations of the satellites, and identifying the satellites based on an updated geographic location and updated locations. In some embodiments, the computer-executable instructions, when executed by the processor, can cause the processor to perform operations that further can include determining if a data transfer by the satellites to the requesting device has been completed; and in response to a determination that the data transfer has not been completed, again identifying the satellites.

In some embodiments, generating the instructions can include generating instructions that define how data is to be divided into data portions for delivery by the satellites and a time at which each data portion is to be delivered. In some embodiments, a first satellite can deliver a first of the data portions to the requesting device at a first time, and a second satellite can deliver a second of the data portions to the requesting device at the first time. In some embodiments, a first satellite can deliver a first of the data portions to the requesting device at a first time, and a second satellite can deliver a second of the data portions to the requesting device at a second time. In some embodiments, the satellites can deliver the data portions to the requesting device substantially simultaneously to increase available bandwidth for the requesting device.

In some embodiments, the data includes a first instance of data intended for the requesting device and a second instance of data intended for another device. A first satellite can deliver the first instance of data to the requesting device at the time, and a second satellite can deliver the second instance of data to the other device at the same time. In some embodiments, the first instance of data can include a first token that can be unique to the requesting device, and the second instance of data can include a second token that can be unique to the other device. In some embodiments, a first satellite can deliver the data to the requesting device at the time, and a second satellite can deliver the data to another device at the same time.

According to another aspect of the concepts and technologies disclosed herein, a method is disclosed. The method can include receiving, at a computer including a processor, a data request that can identify a requesting device, data to be received by the requesting device, and a time at which the data is to be received by the requesting device; determining, by the processor, a geographic location of the requesting device and locations of two or more satellites; identifying, by the processor and based on the geographic location of the requesting device and the locations of the two or more satellites, satellites that are to provide the data to the requesting device; generating, by the processor, instructions for loading network requirements to the satellites; and providing, by the processor and to at least one of the satellites, the instructions.

In some embodiments, the computer-executable instructions, when executed by the processor, can cause the processor to perform operations that further can include determining if changes should be made to the satellites that are to provide the data to the requesting device; and in response to a determination that the changes should be made, updating the geographic location of the requesting device and the locations of the satellites, and identifying the satellites based on an updated geographic location and updated locations. In some embodiments, the computer-executable instructions, when executed by the processor, can cause the processor to perform operations that further can include determining if a data transfer by the satellites to the requesting device has been completed; and in response to a determination that the data transfer has not been completed, again identifying the satellites.

In some embodiments, generating the instructions can include generating instructions that define how data is to be divided into data portions for delivery by the satellites and a time at which each data portion is to be delivered. In some embodiments, a first satellite can deliver a first of the data portions to the requesting device at a first time, and a second satellite can deliver a second of the data portions to the requesting device at the first time. In some embodiments, a first satellite can deliver a first of the data portions to the requesting device at a first time, and a second satellite can deliver a second of the data portions to the requesting device at a second time. In some embodiments, the satellites can deliver the data portions to the requesting device substantially simultaneously to increase available bandwidth for the requesting device.

In some embodiments, the data includes a first instance of data intended for the requesting device and a second instance of data intended for another device. A first satellite can deliver the first instance of data to the requesting device at the time, and a second satellite can deliver the second instance of data to the other device at the same time. In some embodiments, the first instance of data can include a first token that can be unique to the requesting device, and the second instance of data can include a second token that can be unique to the other device. In some embodiments, a first satellite can deliver the data to the requesting device at the time, and a second satellite can deliver the data to another device at the same time.

According to yet another aspect of the concepts and technologies disclosed herein, a computer storage medium is disclosed. The computer storage medium can store computer-executable instructions that, when executed by a processor, cause the processor to perform operations. The operations can include receiving a data request that can identify a requesting device, data to be received by the requesting device, and a time at which the data is to be received by the requesting device; determining a geographic location of the requesting device and locations of two or more satellites; identifying, based on the geographic location of the requesting device and the locations of the two or more satellites, satellites that are to provide the data to the requesting device; generating instructions for loading network requirements to the satellites; and providing, to at least one of the satellites, the instructions.

In some embodiments, the computer-executable instructions, when executed by the processor, can cause the processor to perform operations that further can include determining if changes should be made to the satellites that are to provide the data to the requesting device; and in response to a determination that the changes should be made, updating the geographic location of the requesting device and the locations of the satellites, and identifying the satellites based on an updated geographic location and updated locations. In some embodiments, the computer-executable instructions, when executed by the processor, can cause the processor to perform operations that further can include determining if a data transfer by the satellites to the requesting device has been completed; and in response to a determination that the data transfer has not been completed, again identifying the satellites.

In some embodiments, generating the instructions can include generating instructions that define how data is to be divided into data portions for delivery by the satellites and a time at which each data portion is to be delivered. In some embodiments, a first satellite can deliver a first of the data portions to the requesting device at a first time, and a second satellite can deliver a second of the data portions to the requesting device at the first time. In some embodiments, a first satellite can deliver a first of the data portions to the requesting device at a first time, and a second satellite can deliver a second of the data portions to the requesting device at a second time. In some embodiments, the satellites can deliver the data portions to the requesting device substantially simultaneously to increase available bandwidth for the requesting device.

In some embodiments, the data includes a first instance of data intended for the requesting device and a second instance of data intended for another device. A first satellite can deliver the first instance of data to the requesting device at the time, and a second satellite can deliver the second instance of data to the other device at the same time. In some embodiments, the first instance of data can include a first token that can be unique to the requesting device, and the second instance of data can include a second token that can be unique to the other device. In some embodiments, a first satellite can deliver the data to the requesting device at the time, and a second satellite can deliver the data to another device at the same time.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
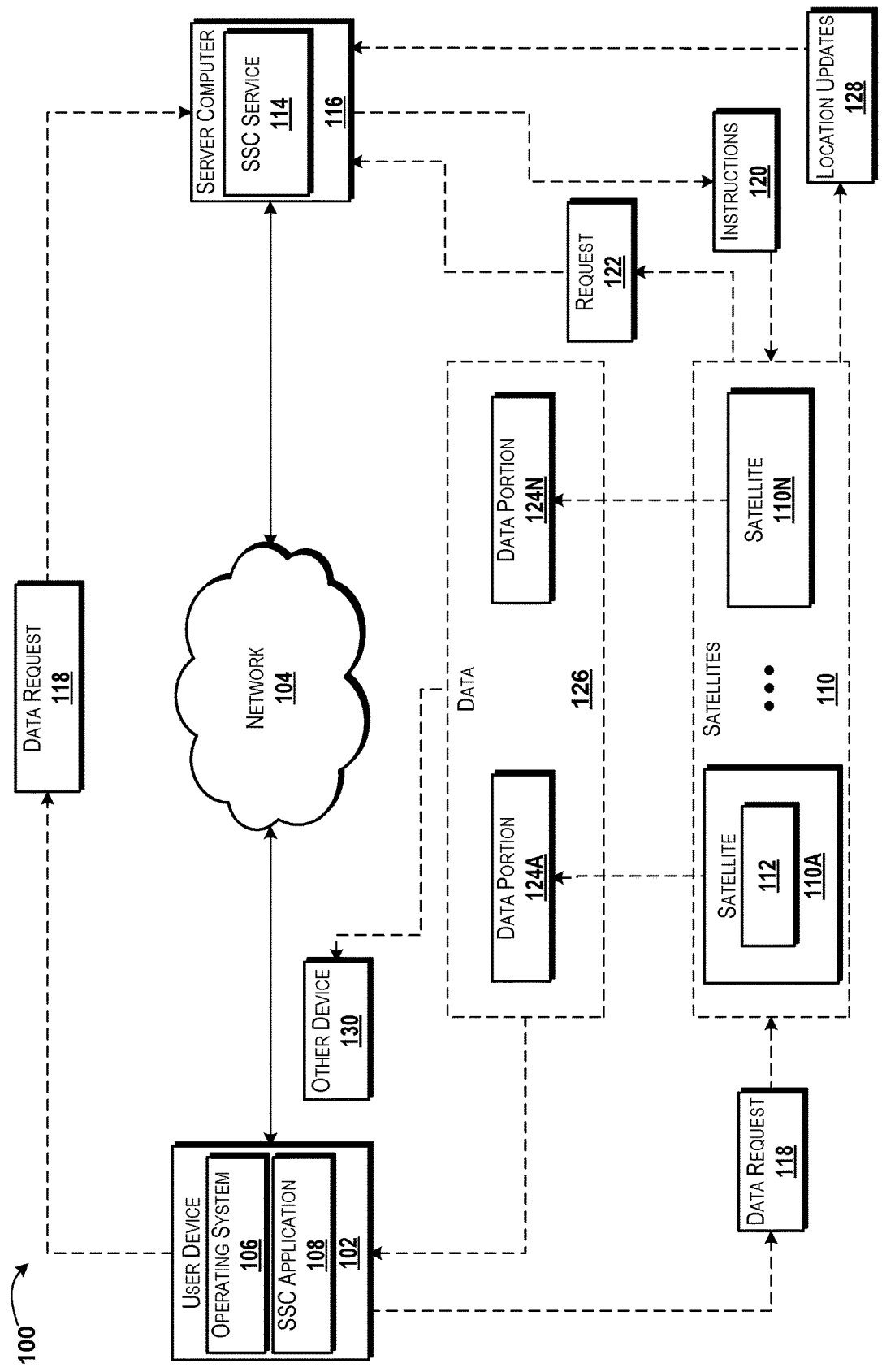
FIG. 1 is a system diagram illustrating an illustrative operating environment for various embodiments of the concepts and technologies described herein.

The following detailed description is directed to synchronized satellite communications. A user device can request data from satellites and/or a synchronized satellite communication service. In some embodiments, the user device can send, to the synchronized satellite communication service and/or to one or more of the satellites, a request for the data, for example a data request. In some embodiments, the data request can identify the data that is being requested by the user device, an identity and/or address of the user device, a location of the user device, a time at which or over which delivery of the data is being requested, combinations thereof, or the like. In some embodiments of the concepts and technologies disclosed herein, a satellite that receives the data request can forward, to the synchronized satellite communication service, a request that can provide some or all information in the data request to the synchronized satellite communication service. It should be understood that this example is illustrative, and therefore should not be construed as being limiting in any way.

The synchronized satellite communication service can be configured to determine, based on information in the data request and/or the request, the data that is to be delivered to the requesting device (e.g., the user device) and the time the data is to be provided to the user device. The synchronized satellite communication service also can be configured to determine a location of the user device and locations of one or more of the satellites at a current time and/or a future time if delivery of the data was requested at a future time. The synchronized satellite communication service also can be configured to determine a number of satellites that are to provide the data to the user device based, for example, on an amount of data being transferred, time constraints set for the data transmission, bandwidth limitations of the satellites, combinations thereof, or the like. Additionally, embodiments of the concepts and technologies disclosed herein can be used to provide the same data and/or different data to multiple devices at the same time.

Based on the locations of the user device and the satellites, and based on the bandwidth needs and requirements, the synchronized satellite communication service can identify the satellites that are to provide the data to the user device. The synchronized satellite communication service can be configured to generate instructions to load the network requirements to the identified satellites, e.g., to send the instructions to the satellites to orchestrate and/or otherwise activate communication channels with the satellites. The instructions also can instruct the satellites how to divide the data among the satellites, and how the satellites will synchronize transmission of the resulting data portions to the user device so that the user device can assemble the data portions into the data. These and other aspects of the concepts and technologies disclosed herein will be illustrated and described herein in more detail.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for synchronized satellite communications will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more server computers, desktop computers, terrestrial communication tower computing systems, mobile telephones, smartphones, laptop computers, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a synchronized satellite communication application 108 (labeled "SSC Application" in FIG. 1) and/or other applications (not illustrated in FIG. 1). The operating system 106 can include a computer program that can control the operation of the user device 102. The synchronized satellite communication application 108 can include an executable program that can be configured to execute on top of the operating system 106 to provide various functions.

In particular, the synchronized satellite communication application 108 can be configured to coordinate communications between the user device 102 and one or more satellites 110A-N (hereinafter collectively and/or generically referred to as "satellites 110") to obtain data and/or content for consumption, viewing, and/or other use by the user device 102 and/or one or more of the applications executing thereon. According to various embodiments of the concepts and technologies disclosed herein, the user device 102 can be configured to communicate with one or more of the satellites 110 via one or more satellite links, via one or more terrestrial satellite relays (that can relay signals to and from the user device 102 and the satellites 110), and/or other communication links.

As will be explained in more detail below, one or more of the satellites 110 can host and/or execute a synchronization application 112 to coordinate communications between the satellites 110 and the user device 102. Although the synchronization application 112 is only illustrated with regard to the satellite 110A, it should be understood that one or more and/or each of the satellites 110 can host and/or execute an instance of the synchronization application 112. For example, the satellite 110N also executes the synchronization application 112 in the illustrated embodiment, though this is not separately shown in FIG. 1. Because one or more the satellites 110 can include or omit the synchronization application in some instances, it should be understood that the illustrated embodiment is illustrative and should not be construed as being limiting in any way.

The user device 102 also can be configured to communicate with a synchronized satellite communication service 114 or other application or service, which can be hosted and/or executed by a device such as a server computer 116. According to various embodiments, the functionality of the server computer 116 may be provided by one or more server computers, application servers, web servers, desktop computers, terrestrial communication tower computing systems, other computing systems, and the like. It should be understood that the functionality of the server computer 116 may be provided by a single device, by two or more similar devices, and/or by two or more dissimilar devices. For purposes of describing the concepts and technologies disclosed herein, the server computer 116 is described herein as an application server. It should be understood that this embodiment is illustrative, and should not be construed as being limiting in any way.

In various embodiments of the concepts and technologies disclosed herein, the synchronized satellite communication application 108 can be configured to manage communications with the satellites 110 via direct communications with the satellites 110 and/or via communications with the server computer 116 (and/or the synchronized satellite communication service 114 hosted and/or executed thereby). It should be understood that these examples are illustrative, and therefore should not be construed as being limiting in any way.

According to various embodiments of the concepts and technologies disclosed herein, the synchronized satellite communication application 108 can be configured to generate a data request 118. The data request 118 can correspond to a request for a data file, streaming content, or the like; for a type of information, stream, or the like; and/or another type of request for data. By way of example, the data request 118 can request the delivery of content to the user device 102. In some embodiments, the data request 118 can include various types of information such as, for example, an identifier for the requesting device (e.g., the user device 102); an address for the requesting device; data that identifies the data being requested by the user device 102; timing information, if desired (e.g., when the data should be delivered); combinations thereof; or the like. In some embodiments, the user device 102 can send the data request 118 to the server computer 116 and in other embodiments, the user device 102 can send the data request 118 to one or more of the satellites 110. Both example embodiments will be described below in more detail.

In some embodiments in which the data request 118 is sent by the user device 102 to the server computer 116, the synchronized satellite communication service 114 can be configured to recognize the data request 118, and to identify the requesting device (e.g., the user device 102); the data being requested; a time at which the requested data is to be delivered to the user device 102; and/or other aspects of the data being requested as illustrated and described herein. In some embodiments, the synchronized satellite communication service 114 can obtain the data that is to be provided to the requesting device, e.g., by accessing a data storage location, server, or other resource to obtain a copy of the data. In some other embodiments, the data may be stored at or by one or more of the satellites 110, so the synchronized satellite communication service 114 may not obtain a copy of the data in all embodiments. It should be understood that this example is illustrative, and therefore should not be construed as being limiting in any way.

In some embodiments, the synchronized satellite communication service 114 can be configured to generate and send, to one or more of the satellites 110, instructions 120. The instructions 120 can be configured to instruct one or more of the satellites 110 to send the requested data to the requesting device at the requested time (or immediately if no time is specified). Thus, although not separately illustrated in FIG. 1, the instructions 120 can be sent to the satellites 110 with the data (e.g., the server computer 116 can obtain a copy of the data and forward that data to the satellites 110 with and/or as part of the instructions 120). It should be understood that this example is illustrative, and therefore should not be construed as being limiting in any way.

In some other embodiments in which the data request 118 is sent by the user device 102 to one or more of the satellites 110, the data request 118 can be received by one or more of the satellites 110. The receiving satellite 110 can be configured, e.g., via execution of the synchronization application 112, to request establishment of one or more communication channels or links between the satellites 110 and the requesting device (e.g., the user device 102) via which the data being requested can be delivered. In some embodiments, the satellites 110 can be configured to obtain the data from the server computer 116 as explained above, while in some other embodiments the satellites 110 may already store the data. Thus, in some embodiments, the satellites 110 can forward, to the server computer 116, a request 122. The request 122 can request establishment and/or orchestration of one or more communications channels and/or links between the satellites 110 and the requesting device (e.g., the user device 102). In some embodiments, the request 122 also can include a request for the data that was requested by way of the data request 118. The satellites 110 can receive, in response to the request 122, the instructions 120 for effecting delivery of the data to the requesting device (e.g., the user device 102). It should be understood that these examples are illustrative, and therefore should not be construed as being limiting in any way.

According to various embodiments of the concepts and technologies disclosed herein, the synchronized satellite communication service 114 can be configured to synchronize delivery of the data from the satellites 110 to the user device 102. In particular, the synchronized satellite communication service 114 can be configured to determine a location of the user device 102 (or other device that has requested the data, e.g., by way of the data request 118). According to various embodiments of the concepts and technologies disclosed herein, the location of the user device 102 can be determined without using terrestrial location determination technologies, though this is not necessarily the case in all embodiments.

In some embodiments, for example, the location of the user device 102 can be determined by the synchronized satellite communication service 114 via communications with the user device 102, via communications with the satellites 110, via communications with a location determination device or system, and/or in alternative manners. In some embodiments, the satellites 110 can be configured to track a location of the user device 102, so the synchronized satellite communication service 114 can be configured to request the current location of the user device 102 from the satellites 110. Because the location of the user device 102 can be determined in additional and/or alternative manners, it should be understood that these examples are illustrative, and therefore should not be construed as being limiting in any way.

Additionally, the synchronized satellite communication service 114 can be configured to determine the locations of one or more of the satellites 110. In particular, the synchronized satellite communication service 114 can be configured to determine a location of the one or more satellites 110 at a current time and/or to project or predict one or more locations of the one or more satellites 110 at some future time, e.g., when the data is to be delivered to the user device 102. Thus, the synchronized satellite communication service 114 can be configured to determine, based on locations of the user device 102 and/or the satellites 110 at a current time and/or at some time in the future, which of the satellites 110 are to provide the data to the user device 102. Thus, it can be appreciated that the synchronized satellite communication service 114 can be configured to identify the satellites 110 that will provide data to the user device 102 based on locations of the satellites 110 and/or the user device 102. It should be understood that this example is illustrative, and therefore should not be construed as being limiting in any way.

Based on the locations of the user device 102 and the one or more satellites 110, the synchronized satellite communication service 114 can identify the satellites 110 that are to provide the data to the user device 102. In some embodiments, the synchronized satellite communication service 114 can predict which satellites 110 will be available at some future delivery time and identify, based on the predicted availability, the satellites 110 that will provide the data to the user device 102. The synchronized satellite communication service 114 also can be configured to orchestrate communication links between the identified satellites 110 at some current time and/or at some time in the future (e.g., at a requested delivery time). It should be understood that this example is illustrative, and therefore should not be construed as being limiting in any way.

In some embodiments, the synchronized satellite communication service 114 can be configured to determine network requirements for the communication links between the satellites 110 and the user device 102. The network requirements can include spatial location or relationship (e.g., a location in orbit, a location relative to a point on the surface of the earth, etc.); bandwidth requirements for the data transmission; security and/or communication protocols for the data transmission; time constraints (e.g., delivery time, transmission duration, etc.); combinations thereof; or the like. The synchronized satellite communication service 114 can then load the network requirements to the satellites 110 to create a satellite network between the identified satellites 110 and the user device 102. According to various embodiments of the concepts and technologies disclosed herein, including the embodiment illustrated in FIG. 1, the synchronized satellite communication service 114 can load the network requirements to the satellites by way of sending instructions 120 that encompass the requirements. It should be understood that this example is illustrative, and therefore should not be construed as being limiting in any way.

In some example embodiments, determining the network requirements can include determining security requirements and/or other considerations as illustrated and described herein. For example, certain satellites 110 may be chosen to participate in the synchronized satellite communication service 114 based on their orbital structure around the planet. For example, those satellites 110 that are closer to the earth (e.g., in low earth orbit ("LEO") at a distance of about five hundred to one thousand kilometers versus in high earth orbit ("HEO") at a distance of about ten thousand kilometers) may have a higher value for security or trust in the synchronized satellite communication service 114 because those satellites 110 may be less susceptible to communication attacks such as, for example, man-in-the-middle strategies, which may aim to intercept and/or relay spurious data. In another example, satellites 110 that are in a geostationary orbit ("GEO")(e.g., at a distance of about thirty-six thousand kilometers) may have more associated security than those with a moving, elliptical orbit. It should be understood that this example is illustrative, and therefore should not be construed as being limiting in any way.

In some embodiments, identifying the satellites 110 that are to provide the data to the user device 102 can further include determining, based on various considerations, a number of satellites 110 that are to provide the data to the user device 102. In particular, in some embodiments, the bandwidth of communications channels supported by the satellites 110 may be limited, so more than one satellite 110 may be needed to deliver the data to the user device 102 in a required time limit (e.g., during a time the satellites 110 can communicate with the user device 102). Thus, more than one satellite 110 may be required to provide the data to the user device 102. Alternatively, an expected amount of bandwidth and/or demand for communications channels provided by the satellites 110 may dictate the use of more than one satellite 110. Regardless of the motivation, more than one satellite 110 may be needed and may be identified by the synchronized satellite communication service 114.

According to various embodiments of the concepts and technologies disclosed herein, the synchronized satellite communication service 114 can be configured to provide, e.g., in the instructions 120, commands or other guidance for the satellites 110 on how to deliver the data to the user device 102 using multiple satellites 110. In particular, the satellites 110 can be configured to create two or more data portions 124A-N (hereinafter collectively and/or generically referred to as "data portions 124") that subsequently can be provided by the satellites 110 to the user device 102. The two or more data portions 124 can collectively correspond to the data that was requested (labeled "data 126" in FIG. 1). Thus, the instructions 120 also can instruct the satellites 110 on how to divide the data 126 into the data portions 124 and how those data portions 124 will be delivered to the user device 102 (e.g., by which of the satellites 110, at what time(s), etc.). It should be understood that this example is illustrative, and therefore should not be construed as being limiting in any way.

According to various embodiments of the concepts and technologies disclosed herein, the satellites 110 can be configured to track locations of the user device 102, and to provide location updates 128 to the synchronized satellite communication service 114. According to various embodiments, the location updates 128 can include updates to the locations of the user device 102 and/or updates to locations of the satellites 110. It should be understood that these examples are illustrative, and therefore should not be construed as being limiting in any way.

In some embodiments of the concepts and technologies disclosed herein, one or more of the satellites 110 can execute a synchronization application 112, as noted above. The synchronization application 112 can be configured to not only track the location of the user device 102, but also to enforce security and location requirements on the user device 102 before delivering the data 126 (e.g., by coordinating the synchronized transmission of the data portions 124 to the user device 102). In some embodiments, for example, the satellites 110 can identify a user device 102 by its specific location and/or address, and transmission of the data 126 may be restricted not only to the specific device that requested the data 126 (e.g., the user device 102), but also at a particular location as defined by the instructions 120, the network requirements, and/or elsewhere. Thus, embodiments of the concepts and technologies disclosed herein can provide secured communications between the satellites 110 and the user device 102, where only specific devices at specific locations can receive the data 126 transmitted by the satellites 110. These and/or other functionality of the satellites 110 may be controlled by the synchronization application 112, in some embodiments. It should be understood that this example is illustrative, and therefore should not be construed as being limiting in any way.

According to various embodiments of the concepts and technologies disclosed herein, the satellites 110 can transmit the data portions 124 to the user device 102, and the user device 102 can be configured, e.g., via execution of the synchronized satellite communication application 108, to assemble the data portions 124 into the data 126. Thus, while FIG. 1 depicts the data 126 being provided to the user device 102, it should be understood that this indication is a schematic representation of how data portions 124 sent to the user device 102 can be effectively received as the data 126 (e.g., by assembly of the data portions 124 at the user device 102). It should be understood that this example is illustrative, and therefore should not be construed as being limiting in any way.

As shown in FIG. 1, another device 130 can also be configured to receive the data 126 (e.g., the same data 126 received by the user device 102) or another instance of data 126 that can differ from the data 126 received by the user device 102. As such, embodiments of the concepts and technologies disclosed herein can be used to deliver the same data 126 to multiple devices (e.g., the user device 102, the other device 130, and/or other devices) in a substantially simultaneous manner, in some embodiments. In some other embodiments of the concepts and technologies disclosed herein, multiple devices (e.g., the user device 102, the other device 130, and/or other devices) can each receive different data 126 at the same time or substantially simultaneously. For example, the user device 102 and the other device 130 can receive individualized instances of data 126 such as, for example, computer environment data (e.g., virtual reality data, cross-reality data, network data, etc.); personalized data (e.g., tokens, passwords, personalized links, etc.); and/or other information. It should be understood that these examples are illustrative, and therefore should not be construed as being limiting in any way.

According to various embodiments of the concepts and technologies disclosed herein, the other device 130 can execute an application that can be the same or similar to the synchronized satellite communication application 108, though this is not illustrated in FIG. 1. Thus, the other device 130 and/or the user device 102 can effectively be controlled by the synchronized satellite communication application 108 and/or the synchronized satellite communication service 114, at least with regard to the requesting of and/or providing of data 126 to the user device 102 and/or the other device 130. It should be understood that these examples are illustrative, and therefore should not be construed as being limiting in any way.

In practice, a user device 102 can request data 126 from satellites 110 and/or a synchronized satellite communication service 114. In some embodiments, the user device 102 can send, to the synchronized satellite communication service 114 and/or to one or more of the satellites 110, a request for the data 126, for example a data request 118. In some embodiments, the data request 118 can identify the data 126 that is being requested by the user device 102, an identity and/or address of the user device 102, a location of the user device 102, a time at which or over which delivery of the data 126 is being requested, combinations thereof, or the like. In some embodiments of the concepts and technologies disclosed herein, a satellite 110 that receives the data request 118 can forward, to the synchronized satellite communication service 114, a request 122 that can provide some or all information in the data request 118 to the synchronized satellite communication service 114. It should be understood that this example is illustrative, and therefore should not be construed as being limiting in any way.

The synchronized satellite communication service 114 can be configured to determine, based on information in the data request 118 and/or the request 122, the data 126 that is to be delivered to the requesting device (e.g., the user device 102) and the time the data 126 is to be provided to the user device 102. The synchronized satellite communication service 114 also can be configured to determine a location of the user device 102 and locations of one or more of the satellites 110 at a current time and/or a future time if delivery of the data 126 was requested at a future time. The synchronized satellite communication service 114 also can be configured to determine a number of satellites that are to provide the data 126 to the user device 102 based, for example, on an amount of data being transferred, time constraints set for the data transmission, bandwidth limitations of the satellites 110, combinations thereof, or the like.

Based on the locations of the user device 102 and the satellites 110, and based on the bandwidth needs and requirements, the synchronized satellite communication service 114 can identify the satellite networks that are to provide the data 126 to the user device 102. As used herein, a "satellite network" can refer to a communication link or channel established between a satellite 110 and a user device 102 or other device. It should be understood that this example is illustrative, and therefore should not be construed as being limiting in any way.

The synchronized satellite communication service 114 can be configured to generate instructions 120 to load the network requirements to the identified satellite networks, e.g., to send the instructions 120 to the satellites 110 to orchestrate and/or otherwise activate communication channels with the satellites 110. The instructions 120 also can instruct the satellites 110 how to divide the data 126 among the satellites 110, and how the satellites 110 will synchronize transmission of the resulting data portions 124 to the user device 102 so that the user device 102 can assemble the data portions 124 into the data 126. Additionally, as explained herein, multiple devices can receive the same data 126 and/or different instances of data 126 using the concepts and technologies disclosed herein. These and other aspects of the concepts and technologies disclosed herein will be illustrated and described herein in more detail.

FIG. 1 illustrates one user device 102, one network 104, two or more satellites 110, one server computer 116, and one other device 130. It should be understood, however, that various implementations of the operating environment 100 can include one or more than one user device 102; one or more than one network 104; one, two, or more than two satellites 110; zero, one, or more than one server computer 116; and/or zero, one, or more than one other device 130. As such, the illustrated embodiment should be understood as being illustrative, and should not be construed as being limiting in any way.

Figure 2:
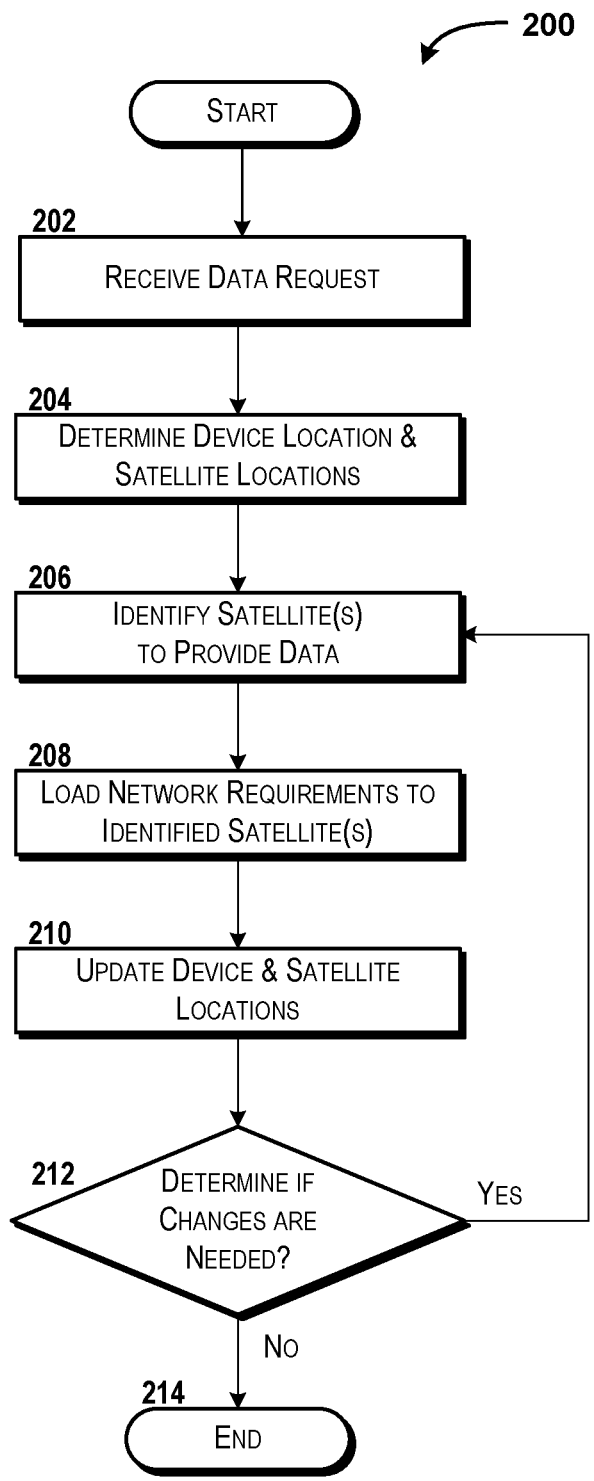
FIG. 2 is a flow diagram showing aspects of a method for using synchronized satellite communications, according to an illustrative embodiment of the concepts and technologies described herein.

Turning now to FIG. 2, aspects of a method 200 for using synchronized satellite communications will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 116, to perform one or more operations and/or causing the processor to direct other components of the computing system or device to perform one or more of the operations.

For purposes of illustrating and describing the concepts of the present disclosure, the method 200 is described herein as being performed by the server computer 116 via execution of one or more software modules such as, for example, the synchronized satellite communication service 114. It should be understood that additional and/or alternative devices and/or network nodes can provide the functionality described herein via execution of one or more modules, applications, and/or other software including, but not limited to, the synchronized satellite communication service 114. Thus, the illustrated embodiments are illustrative, and should not be viewed as being limiting in any way.

The method 200 begins at operation 202. At operation 202, the server computer 116 can receive a data request such as the data request 118. As explained above, the data request 118 can be received by the server computer 116 from the user device 102, in some embodiments. In some other embodiments, the data request received in operation 202 can correspond to the request 122 that can be received by the server computer 116 from one or more of the satellites 110. Thus, it can be appreciated that the user device 102 can send the data request 118 to the satellites 110, and that satellites 110 can send, to the server computer 116, the request 122 in operation 202.

Regardless of how the information is provided to the server computer 116, the server computer 116 can determine in operation 202 that a request for data 126 has been received. As noted above, the data request 118 and/or the request 122 can include information identifying the requesting device and/or an address associated with the requesting device; the data 126 being requested; a timing associated with the delivery of the data 126 to the requesting device; and/or other information. It should be understood that this example is illustrative, and therefore should not be construed as being limiting in any way.

From operation 202, the method 200 can proceed to operation 204. At operation 204, the server computer 116 can determine a device location (e.g., a geographic location of the requesting device such as the user device 102) and locations of one or more satellites 110 (e.g., locations, relative to the earth and/or relative to the requesting device of one or more of the satellites 110). According to various embodiments of the concepts and technologies disclosed herein, the server computer 116 can perform operation 204 by sending, to the satellites 110, a request for a location of the requesting device (e.g., the user device 102) and a request for the locations and/or positions of the satellites 110. In some other embodiments, the server computer 116 can perform operation 204 by querying other location systems (e.g., a location server) for locations of the requesting device and the satellites 110.

According to various embodiments of the concepts and technologies disclosed herein, operation 204 can include obtaining locations of the requesting device (e.g., the user device 102) and the satellites 110 without using terrestrial location determination devices and/or systems such as the global positioning system ("GPS") and/or the like. It can be appreciated that a satellite-determined geographic location of the requesting device (e.g., the user device 102) can be extremely accurate in terms of latitude, longitude, and/or elevation; particularly relative to GPS. In particular, some embodiments of the concepts and technologies disclosed herein can include determining geographic location of the requesting device (e.g., the user device 102) to an accuracy of less than one meter. Similarly, the locations of the satellites 110 can be determined with extreme precision, in various embodiments. It should be understood that these example embodiments are illustrative, and therefore should not be construed as being limiting in any way.

From operation 204, the method 200 can proceed to operation 206. At operation 206, the server computer 116 can identify one or more satellites 110 and/or satellite communication links to provide the data 126 requested in the request received in operation 202. According to various embodiments of the concepts and technologies disclosed herein, the server computer 116 can identify, in operation 206, two or more satellites 110 that will provide the data 126. The identification of the satellites 110 in operation 206 can be based, for example, on the locations of the requesting device (e.g., the user device 102) and the satellites 110; on the amount of data 126 that is to be transmitted and/or the bandwidth required for the transmission; the timing of the delivery of the data 126; and/or other considerations.

In particular, as noted above, the data 126 can be requested with a time indicator, namely an indicator that can specify a time at which the data 126 should be delivered to the requesting device; a time duration during which the data 126 should be delivered to the requesting device; or the like. Thus, the server computer 116 can determine, based on an identification of the requesting device and the data 126, how much data (e.g., in bits, bytes, or the like) is to be transmitted to the requesting device in how much time (e.g., in seconds, minutes, or the like).

By way of example, a requesting device such as the user device 102 can request the data 126 where the data 126 can include a file having a size of seven hundred fifty megabytes, and where the data is to be delivered at a specified time over a two minute window. The server computer 116 can determine, for example, that the satellites 110 that are in a location at which the data 126 can be delivered at the specified time have a bandwidth capability of fifteen megabits per second. In this example, the server computer 116 can determine that one satellite 110 will be unable to deliver the data 126 to the user device 102 over two minutes. Thus, the server computer 116 can determine that two satellites 110 will deliver the data 126 in a synchronized manner to the user device 102.

In particular, the server computer 116 can determine that the maximum bandwidth of the satellites 110 in this example is 3.75 Megabytes per second (MBps) based on the fifteen megabits per second figure; and therefore that the data transfer would take one satellite two hundred seconds (three minutes and twenty seconds). As such, the server computer 116 can determine that two satellites 110 operating in a synchronized manner could deliver the data in one minute forty seconds, and those two satellites 110 can be identified by the server computer 116 based on projected and/or predicted locations of the satellites 110 at the future time, as well as the location of the user device 102. It should be understood that this example is illustrative, and therefore should not be construed as being limiting in any way.

Thus, operation 206 can include identifying the satellites 110 to provide the data 126; determining the amount of data (e.g., file size; stream size, etc.) that is to be transmitted; determining how many satellites 110 will be used to provide the data 126 (e.g., how many data portions 124 will be created); and identifying other requirements for the data transmission. Although not separately shown in FIG. 2, it can be appreciated that the server computer 116 can be configured to generate the instructions 120 in operation 206 or in a separate operation, where the instructions 120 can define the network requirements for the data transmission such as, for example, which satellites 110 are to provide the data 126; a time at which the data 126 is to be provided; a duration of the data transmission; how the data 126 is to be divided (e.g., into data portions 124); and the like. Because other network requirements are illustrated and described herein, it should be understood that these example requirements are illustrative and should not be construed as being limiting in any way.

From operation 206, the method 200 can proceed to operation 208. At operation 208, the server computer 116 can load the network requirements to the identified satellites 110. In some embodiments of operation 208, the server computer 116 can send the instructions 120 generated in operation 206 to the satellites 110 to effectively "load" the network requirements to the satellites 110. In some embodiments of the concepts and technologies disclosed herein, the instructions 120 can be sent in operation 208 by the server computer 116 with a copy of the data 126 that is to be provided to the user device 102. In some other embodiments, the satellites 110 may already store the data 126. It should be understood that in some embodiments, the server computer 116 can trigger the loading of the network requirements and/or the providing of the instructions 120 in other manners and/or by other devices. Because the network requirements can be loaded to the satellites in additional and/or alternative manners, it should be understood that this example is illustrative, and therefore should not be construed as being limiting in any way.

From operation 208, the method 200 can proceed to operation 210. At operation 210, the server computer 116 can update a device location (e.g., a current geographic location of the user device 102) and satellite locations (e.g., current locations and/or positions of the satellites 110 relative to the earth, the user device 102, other satellites 110, or the like). Thus, operation 210 can correspond to the server computer 116 tracking movements of the satellites 110 and/or the receiving device (e.g., the user device 102); the server computer 116 receiving location updates from various entities; and/or otherwise tracking locations of the user device 102 and/or the satellites 110. It should be understood that these examples are illustrative, and therefore should not be construed as being limiting in any way.

From operation 210, the method 200 can proceed to operation 212. At operation 212, the server computer 116 can determine if any changes are needed. In particular, operation 212 can correspond to the server computer 116 determining if the satellites 110 identified in operation 206 should be changed based on changes in locations; changes in available and/or needed bandwidths; changes in the size or identification of the data 126; changes in available satellites 110; changes in positions of the satellites 110; and/or other considerations. As such, operation 212 can correspond to the server computer 116 updating the identification in operation 206, in some embodiments, or determining that the facts and/or situations that led the identification in operation 206 (e.g., location information, the size of the data 126, the timing of the delivery of the data 126, combinations thereof, or the like) have changed. Because other considerations are illustrated and described herein with regard to identifying the satellites 110 to transmit the data 126, it should be understood that these example considerations are illustrative, and therefore should not be construed as being limiting in any way.

If the server computer 116 determines, in operation 212, that changes are needed, the method 200 can return to operation 206, and the server computer 116 can again identify the satellites 110 to provide the data 126. Thus, it can be appreciated that operations 206-212 can be iterated until the server computer 116 determines, in any iteration of operation 212, that changes are not needed.

In some embodiments of the concepts and technologies disclosed herein, the determination in operation 212 can instead be a determination if the transmission of the data 126 has been completed. In such an embodiment, operation 210 can be omitted from the method 200 or moved elsewhere in the method flow, and flow from operation 208 can instead proceed to the server computer 116 determining if the data transfer has been completed. Thus, the server computer 116 can determine, in operation 212, if the requested data transfer has been completed, and if not, the server computer 116 can be configured to update the locations (as in operation 210) and/or to determine if changes are needed by returning the method flow to operation 206 and again identifying the satellites 110 to provide the data 126. Thus, it can be appreciated that the server computer 116 may not actually determine if changes are needed; rather the server computer 116 may merely re-determine the satellites 110 if the server computer 116 determines in operation 212 that the data transfer has not completed. In this embodiment, operations 206-212 can be iterated until the server computer 116 determines, in any iteration of operation 212, that the data transfer has been completed. It should be understood that this example is illustrative, and therefore should not be construed as being limiting in any way.

If the server computer 116 determines, in operation 212, that changes to the data transfer are not needed, the method 200 can proceed to operation 214. In the alternative embodiment noted above, where operation 212 corresponds to a determination as to whether or not the data transfer has been completed, the method 200 can proceed to operation 214 if the server computer 116 determines, in operation 212, that the data transfer has been completed. The method 200 can end at operation 214.

Figure 3:
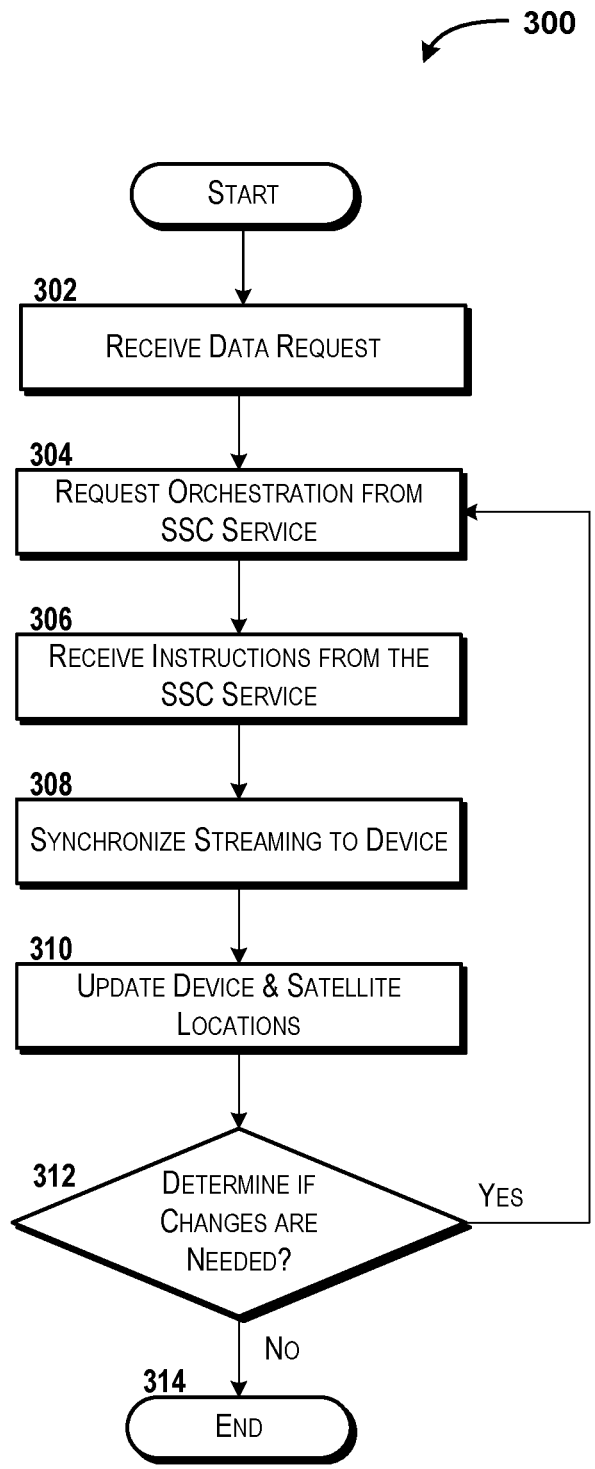
FIG. 3 is a flow diagram showing aspects of a method for using synchronized satellite communications, according to another illustrative embodiment of the concepts and technologies described herein.

Turning now to FIG. 3, aspects of a method 300 for using synchronized satellite communications will be described in detail, according to an illustrative embodiment. For purposes of illustrating and describing the concepts of the present disclosure, the method 300 is described herein as being performed by one of the satellites 110 via execution of one or more software modules such as, for example, the synchronization application 112. It should be understood that additional and/or alternative devices and/or network nodes can provide the functionality described herein via execution of one or more modules, applications, and/or other software including, but not limited to, the synchronization application 112. Thus, the illustrated embodiments are illustrative, and should not be viewed as being limiting in any way.

The method 300 begins at operation 302. At operation 302, the satellite 110 can receive a data request such as the data request 118. As explained above, the data request 118 can be received by the satellite 110 from the user device 102, in some embodiments. In some other embodiments, the data request 118 can be forwarded to the satellite 110 by other devices associated with the network 104 and/or other networks. Regardless of how the information is provided to the satellite 110, the satellite 110 can determine in operation 302 that a request for data 126 has been received. The data request 118 can include information identifying the requesting device (e.g., the user device 102); an address associated with the requesting device; the data 126 being requested; a timing associated with the delivery of the data 126 to the requesting device; other information; combinations thereof; or the like. It should be understood that this example is illustrative, and therefore should not be construed as being limiting in any way.

From operation 302, the method 300 can proceed to operation 304. At operation 304, the satellite 110 can request orchestration from the synchronized satellite communication service 114. In particular, the satellite 110 can request, from the synchronized satellite communication service 114, instructions for creating one or more satellite links with the requesting device to deliver the data 126 requested in operation 302. In some embodiments, the satellite 110 can be configured to request the orchestration via a request 122, which can include various data such as, for example, the identity of the requesting device; the location of the requesting device and/or the satellites 110; an address associated with the requesting device; timing associated with the data transfer; an identification of the data 126 requested by way of the data request 118 received in operation 302; combinations thereof; or the like. According to various embodiments of the concepts and technologies disclosed herein, the satellite 110 can be configured to determine the location of the requesting device directly and/or by querying other location systems (e.g., a location server) for locations of the requesting device and the satellites 110.

According to various embodiments of the concepts and technologies disclosed herein, operation 304 can include obtaining locations of the requesting device (e.g., the user device 102) and the satellites 110 without using terrestrial location determination devices and/or systems such as the global positioning system ("GPS") and/or the like. It can be appreciated that a satellite-determined geographic location of the requesting device (e.g., the user device 102) can be extremely accurate in terms of latitude, longitude, and/or elevation; particularly relative to GPS. In particular, some embodiments of the concepts and technologies disclosed herein can include determining geographic location of the requesting device (e.g., the user device 102) to an accuracy of less than one meter. Similarly, the locations of the satellites 110 can be determined with extreme precision, in various embodiments. It should be understood that these example embodiments are illustrative, and therefore should not be construed as being limiting in any way.

From operation 304, the method 300 can proceed to operation 306. At operation 306, the satellite 110 can receive instructions 120 from the server computer 116. In some embodiments, the instructions 120 can be received by the satellite 110 with the data 126 that was requested by the requesting device (e.g., if the satellite 110 did not already store the data 126). Thus, it can be appreciated that the server computer 116 can be configured to identify one or more satellites 110 and/or satellite communication links to provide the data 126 as requested based, for example, on the locations of the requesting device (e.g., the user device 102) and the satellites 110; on the amount of data 126 that is to be transmitted and/or the bandwidth required for the transmission; the timing of the delivery of the data 126; and/or other considerations, as explained in detail with reference to FIG. 2 above. Thus, operation 306 can include receiving the instructions 120 for delivering the data 126 to the requesting device. As noted above, the instructions 120 can define the network requirements for the data transmission such as, for example, which satellites 110 are to provide the data 126; a time at which the data 126 is to be provided; a duration of the data transmission; how the data 126 is to be divided (e.g., into data portions 124); and the like. Because other network requirements are illustrated and described herein, it should be understood that these example requirements are illustrative and should not be construed as being limiting in any way.

From operation 306, the method 300 can proceed to operation 308. At operation 308, the satellite 110 can synchronize delivery of the data 126 to the requesting device (e.g., the user device 102). Thus, the satellite 110 can be configured to perform operation 308 by identifying, based on the instructions 120, another satellite 110 that will assist in delivering the data 126 to the user device 102; timing associated with the data delivery; etc. In some embodiments, the satellite 110 can divide the data into the data portions 124 and provide, to the other satellite 110 that is to assist in delivering the data 126, one of the data portions 124. In some other embodiments, each of the satellites 110 may store a copy of the data 126, so operation 308 can include the satellites 110 being instructed (by the instructions 120 and/or by one of the satellites 110 that can function as a controller for the data delivery), how to divide the data 126.

In various embodiments of the concepts and technologies disclosed herein, a first satellite 110 (e.g., the satellite 110A of FIG. 1) may be configured to send, stream, and/or otherwise transfer a first data portion 124 (e.g., the data portion 124A) to the requesting device (e.g., the user device 102); and a second satellite 110 (e.g., the satellite 110N of FIG. 1) may be configured to send, stream, and/or otherwise transfer a second data portion 124 (e.g., the data portion 124N) to the requesting device (e.g., the user device 102). These transfers can be completed by the two satellites in a synchronized manner (e.g., substantially simultaneously in some embodiments and/or at different times in some other embodiments).

In particular, in some embodiments of the concepts and technologies disclosed herein, two or more satellites 110 can be configured to provide two or more data portions 124 to the requesting device simultaneously to increase available bandwidth (e.g., two satellites 110 can provide about double the bandwidth of one satellite 110 in some embodiments; two satellites 110 can provide about triple the bandwidth of one satellite 110 in some other embodiments; etc.). Thus, multiple satellites 110 can be synchronized to provide the data 126 in a shorter time than may be required with only one satellite 110.

In some other embodiments, two or more satellites 110 can be configured to provide two or more data portions 124 to the requesting device in a non-simultaneous manner. For example, a first of the two satellites 110 may be in a communication range of the user device 102 for a first half of the time needed to transfer the data 126 to the requesting device, while a second of the two satellites 110 may be in a communication range of the user device 102 for the second half of the time needed to transfer the data 126 to the requesting device. Thus, the two satellites 110 may synchronize the data transfers to provide the data 126 to the requesting device without interruption. Because other uses of synchronization can be used for additional and/or alternative benefits (e.g., different numbers of satellites 110 at different times during the data transmission), it should be understood that these examples are illustrative, and therefore should not be construed as being limiting in any way.

In yet other embodiments of the concepts and technologies disclosed herein, a specific piece or instance of data 126 may not be transmitted to the requesting device. Rather, the requesting device (or multiple devices) may be provided with data connectivity during a defined time by the synchronized satellite communication service 114 and/or the satellites 110. Thus, available bandwidth can be modified by the synchronized satellite communication service 114 by instructing the satellites 110 to connect to the requesting device(s) at specific times. Thus, some embodiments of the concepts and technologies disclosed herein can be used to provide flexible bandwidth to precise locations and/or precise users (e.g., devices) at precise times. It should be understood that this example is illustrative, and therefore should not be construed as being limiting in any way.

From operation 308, the method 300 can proceed to operation 310. At operation 310, the satellite 110 can update a device location (e.g., a current geographic location of the user device 102) and satellite locations (e.g., current locations and/or positions of the satellites 110 relative to the earth, the user device 102, other satellites 110, or the like). Thus, operation 310 can correspond to the satellites 110 tracking movements of the receiving device (e.g., the user device 102) and/or updating their own locations. It should be understood that these examples are illustrative, and therefore should not be construed as being limiting in any way.

From operation 310, the method 300 can proceed to operation 312. At operation 312, the satellite 110 can determine if any changes are needed. In particular, operation 312 can correspond to the satellite 110 determining if any additional and/or alternative satellites 110 should be used to provide the data 126. This determination can be based, for example, on changes in locations of the satellites 110 and/or the requesting device; changes in available and/or needed bandwidths; changes in the size or identification of the data 126; changes in available satellites 110; changes in positions of the satellites 110; and/or other considerations. Because other considerations may result in changes being made to the satellites 110 providing the data 126, it should be understood that these example considerations are illustrative, and therefore should not be construed as being limiting in any way.

If the satellite 110 determines, in operation 312, that changes are needed, the method 300 can return to operation 306, and the satellite 110 can again request orchestration from the synchronized satellite communication service 114. Thus, it can be appreciated that operations 306-312 can be iterated until the satellite 110 determines, in any iteration of operation 312, that changes are not needed.

In some embodiments of the concepts and technologies disclosed herein, the determination in operation 312 can be replaced with a determination as to whether the transmission of the data 126 has been completed, as explained with reference to FIG. 2. In such embodiments, operation 310 can be omitted from the method 300, and flow from operation 308 can instead proceed to the satellite 110 determining if the data transfer has been completed in operation 312. Thus, the satellite 110 can determine, in operation 312, if the requested data transfer has been completed, and if not, the satellite 110 can be configured to request orchestration again from the synchronized satellite communication service 114 in case any changes are needed. In such embodiments, operations 306-312 can be iterated until the satellite 110 determines, in any iteration of operation 312, that the data transfer has been completed. It should be understood that this example is illustrative, and therefore should not be construed as being limiting in any way.

If the satellite 110 determines, in operation 312, that changes to the data transfer are not needed, the method 300 can proceed to operation 314. In the alternative embodiment noted above, where operation 312 corresponds to a determination as to whether or not the data transfer has been completed, the method 300 can proceed to operation 314 if the satellite 110 determines, in operation 312, that the data transfer has been completed. The method 300 can end at operation 314.

In some embodiments of the concepts and technologies disclosed herein, the satellites 110 can be used to enable a high-trust communication system that can use synchronized transmissions from the satellites to protect communications. For example, a first of the satellites 110 can be configured to deliver a token, and a second of the satellites 110 can be configured to determine data that can be decoded using the token. In yet other embodiments, a message header, or the like, can be sent via a first communication channel (e.g., supported by a first satellite), and message content can be sent via second communication channel (e.g., supported by a second satellite 110). Thus, in some embodiments of the concepts and technologies disclosed herein, the data portions 124 illustrated and described herein can correspond to portions of the data 126, tokens, headers, and/or other information. It should be understood that these examples are illustrative, and therefore should not be construed as being limiting in any way.

While the above FIGURES have primarily described an embodiment in which a user device 102 requests and receives data 126 (optionally divided into data portions 124), it should be understood that the concepts and technologies disclosed herein can also be used in some embodiments to deliver multiple instances of the same data 126 (optionally divided into multiple instances of the same data portions 124) to multiple recipients in a substantially simultaneous manner. For example, any number of devices (optionally including the user device 102) can receive the same data 126 from one or more satellites 110 at substantially the same time, in some embodiments. Some other embodiments of the concepts and technologies disclosed herein can be used to deliver multiple instances of different data 126 (optionally divided into data portions 124) to multiple recipients in a substantially simultaneous manner. For example, any number of devices (optionally including the user device 102) can receive the personalized instances of data 126 (optionally divided into data portions 124) from one or more satellites 110, in some embodiments.

For example, embodiments of the concepts and technologies disclosed herein can be used to support a virtual reality ("VR") and/or cross-reality ("XR") environment, wherein multiple devices (optionally including the user device 102) can receive data 126 from the satellites 110, where each device may receive a different instance of data 126 (e.g., data that is from the VR perspective of that device, etc.). Thus, embodiments of the concepts and technologies disclosed herein can support the satellites 110 delivering the same or different data 126 to multiple devices simultaneously, in some embodiments. It can be appreciated that because the satellites 110 can deliver data 126 in an extremely focused fashion (e.g., direct to a specific device at a specific location), that each of multiple devices can receive a custom instance of data 126 that can be personalized for that device. Thus, for example, a poll of users may be delivered/conducted via embodiments of the concepts and technologies disclosed herein, where a unique link, token, password, code, or the like (as the data 126) can be delivered to multiple devices substantially simultaneously even at crowded locations using the satellites 110 for delivery of the data 126. It should be understood that this example is illustrative, and therefore should not be construed as being limiting in any way.

Figure 4:
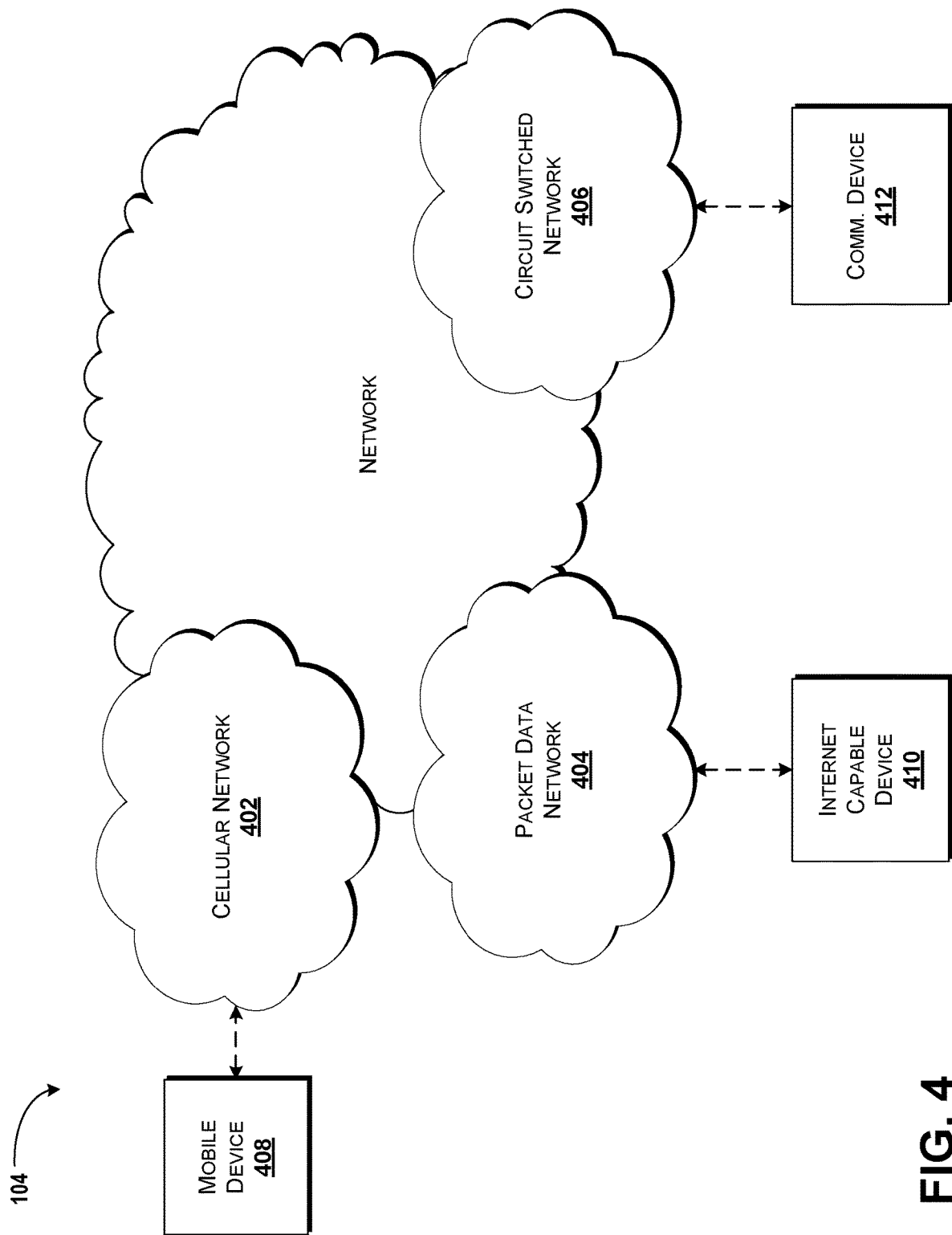
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards, 5G mobile communications standards, other mobile communications standards, and evolved and future mobile communications standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
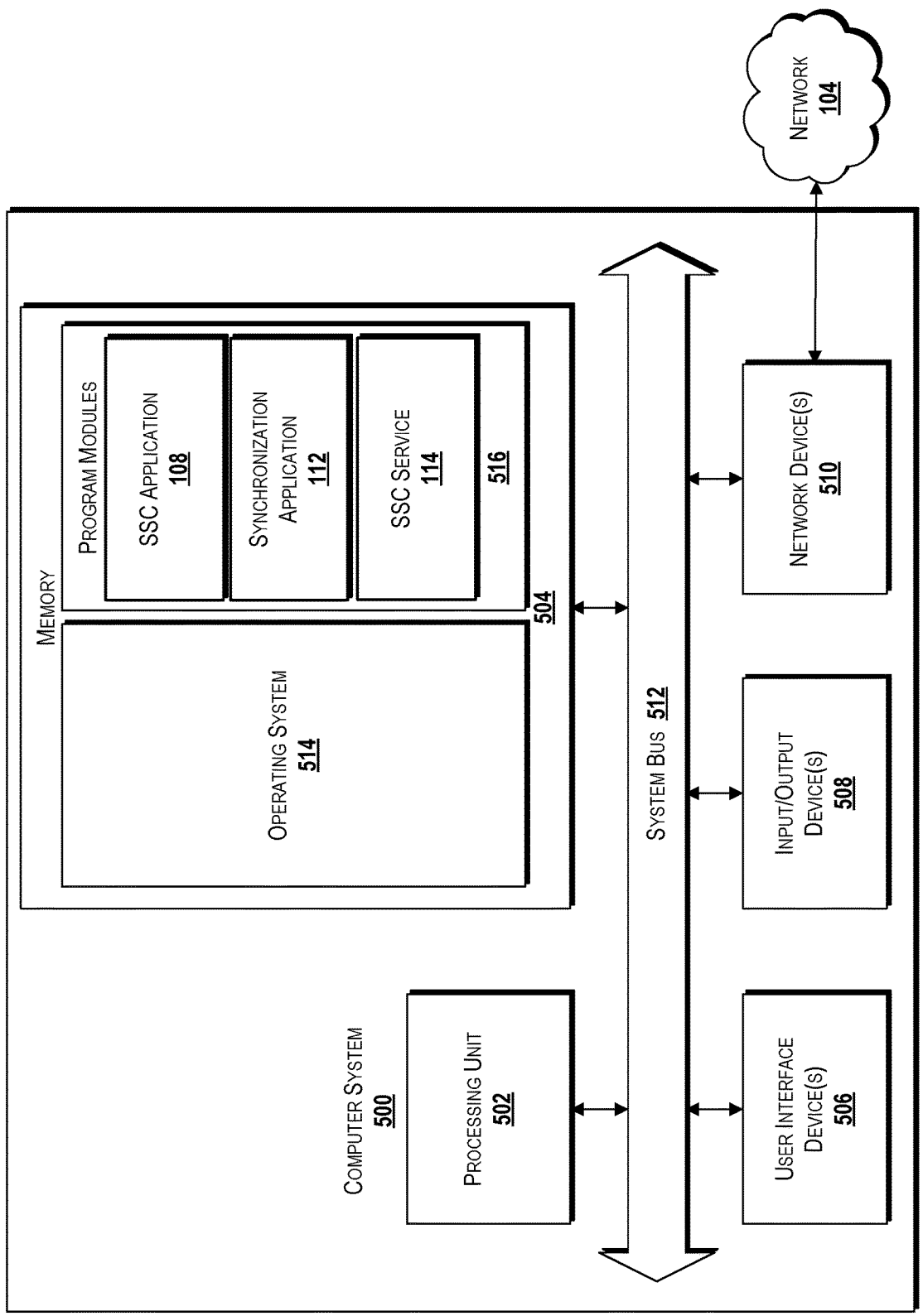
FIG. 5 is a block diagram illustrating an example computer system capable of implementing aspects of the concepts and technologies disclosed herein, according to some illustrative embodiments of the concepts and technologies described herein.

FIG. 5 is a block diagram illustrating a computer system 500 configured to provide the functionality described herein for providing synchronized satellite communications, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the synchronized satellite communication application 108, the synchronization application 112, and/or the synchronized satellite communication service 114. These and/or other programs can be embodied in computer-readable media containing instructions that, when executed by the processing unit 502, perform one or more of the methods 200 and 300 described in detail above with respect to FIGS. 2-3 and/or other functionality as illustrated and described herein. It can be appreciated that, at least by virtue of the instructions embodying the methods 200 and 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the data request 118, the instructions 120, the request 122, the data portions 124, the data 126, the location updates 128, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
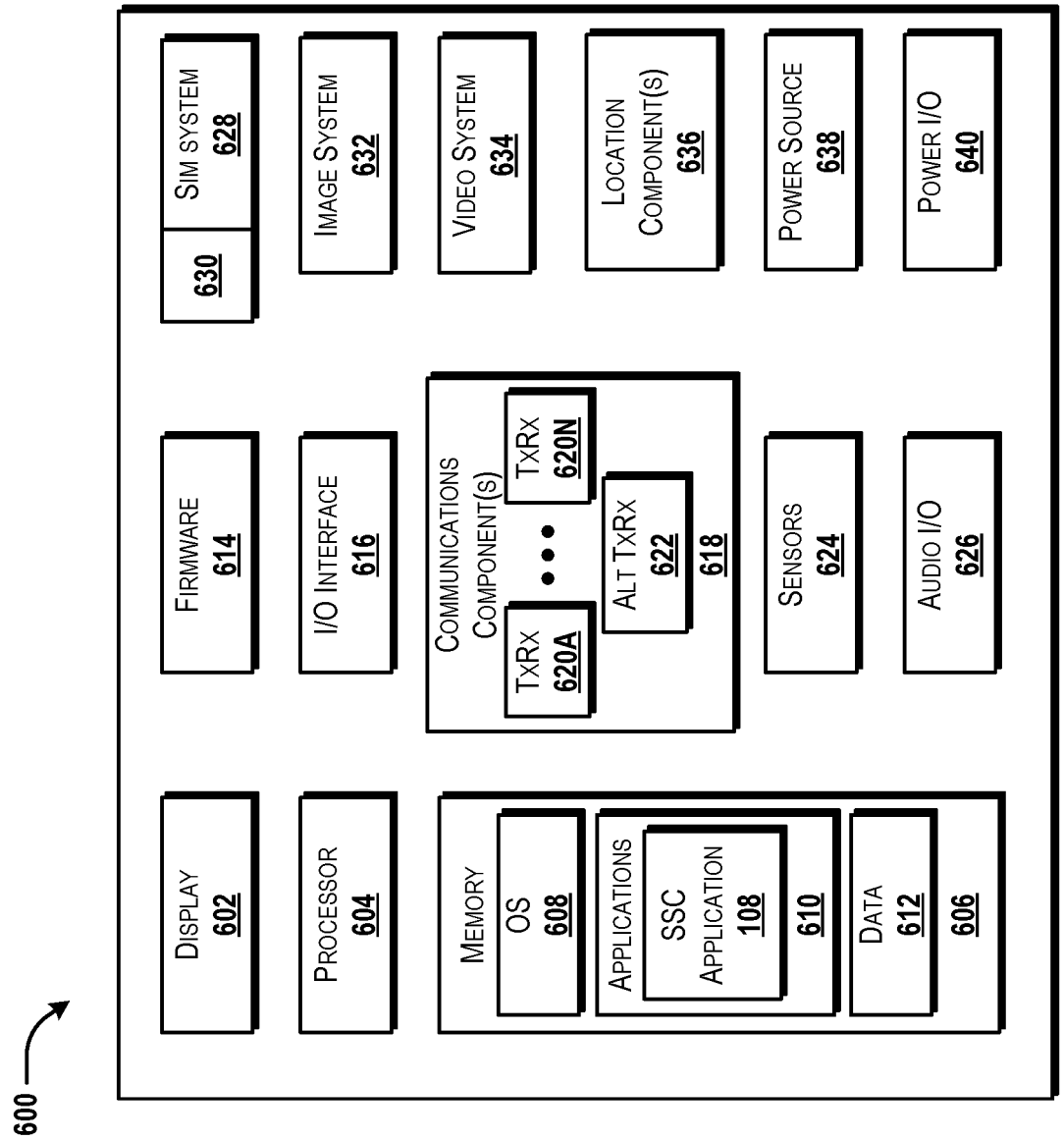
FIG. 6 is a block diagram illustrating an example mobile device capable of implementing aspects of the concepts and technologies disclosed herein, according to some illustrative embodiments of the concepts and technologies described herein.

Turning now to FIG. 6, an illustrative mobile device 600 and components thereof will be described. In some embodiments, the user device 102 and/or the other device 130 described above with reference to FIGS. 1-3 can be configured as and/or can have an architecture similar or identical to the mobile device 600 described herein in FIG. 6. It should be understood, however, that the user device 102 and/or the other device 130 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements such as, for example, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the synchronized satellite communication application 108, the synchronization application 112, the synchronized satellite communication service 114, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, configuring settings, manipulating address book content and/or settings, multi-mode interaction, interacting with other applications 610, and otherwise facilitating user interaction with the operating system 608, the applications 610, and/or other types or instances of data 612 that can be stored at the mobile device 600. The data 612 can include, for example, the data request 118, the instructions 120, the request 122, the data portions 124, the data 126, the location updates 128, and/or applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604.

It can be appreciated that, at least by virtue of storage of the instructions corresponding to the applications 610 and/or other instructions embodying other functionality illustrated and described herein in the memory 606, and/or by virtue of the instructions corresponding to the applications 610 and/or other instructions embodying other functionality illustrated and described herein being accessed and/or executed by the processor 604, the mobile device 600 is a special-purpose mobile device that can facilitate providing the functionality illustrated and described herein. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, the data request 118, the instructions 120, the request 122, the data portions 124, the data 126, the location updates 128, user information, organization information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 104 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
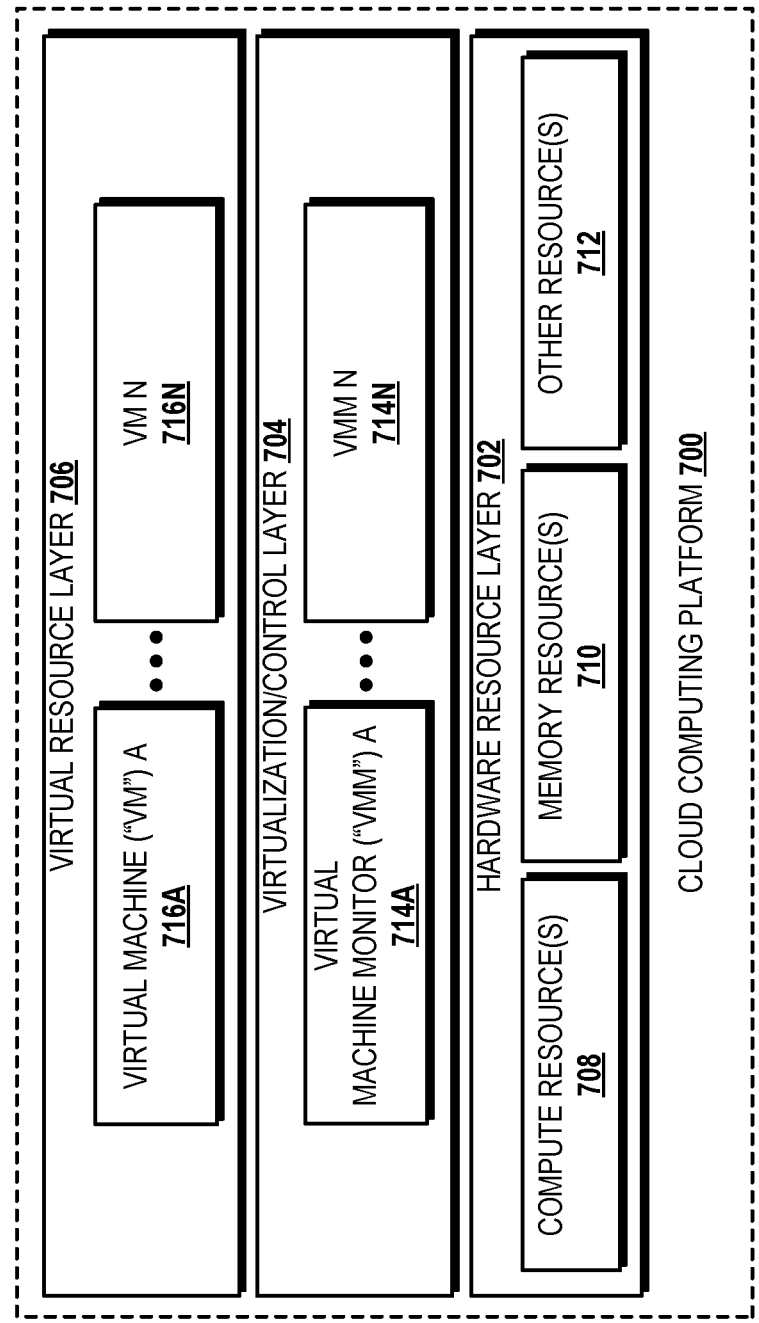
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for providing and/or using synchronized satellite communications and/or for interacting with the synchronized satellite communication service 114. Thus, it can be appreciated that in some embodiments of the concepts and technologies disclosed herein, the cloud computing platform 700 illustrated in FIG. 7 can be used to provide the functionality described herein with respect to the user device 102, the server computer 116, and/or the other device 130. The satellites 110 also can be configured to incorporate some cloud-based technologies, in some embodiments.

The cloud computing platform 700 thus may be utilized to execute any aspects of the software components presented herein. Thus, according to various embodiments of the concepts and technologies disclosed herein, the synchronized satellite communication application 108, the synchronization application 112, and/or the synchronized satellite communication service 114 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the synchronized satellite communication application 108, the synchronization application 112, and/or the synchronized satellite communication service 114, illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that the an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 708 can be or can include one or more hardware components arranged in accordance with architectures available for license from ARM HOLDINGS of Cambridge, United Kingdom. Alternatively, the compute resources 708 can be or can include one or more hardware components arranged in accordance with architectures available from INTEL CORPORATION of Mountain View, California, and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the synchronized satellite communication application 108, the synchronization application 112, the synchronized satellite communication service 114, or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the data request 118, the instructions 120, the request 122, the data portions 124, the data 126, the location updates 128, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for synchronized satellite communications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      receiving a data request that identifies a requesting device controlled by an application, data to be received by the requesting device, and a time at which the data is to be received by the requesting device,
      determining a geographic location of the requesting device and locations of a plurality of satellites,
      identifying, based on the geographic location of the requesting device and the locations of the plurality of satellites, satellites that are to provide the data to the requesting device,
      generating instructions comprising satellite network requirements for the satellites, and
      providing, to at least one of the satellites, the instructions.

2. The system of claim 1, wherein the computer-executable instructions, when executed by the processor, cause the processor to perform operations further comprising:
   determining if changes should be made to the satellites that are to provide the data to the requesting device; and
   in response to a determination that the changes should be made, updating the geographic location of the requesting device and the locations of the satellites, and identifying the satellites based on an updated geographic location and updated locations.

3. The system of claim 1, wherein the computer-executable instructions, when executed by the processor, cause the processor to perform operations further comprising:
   determining if a data transfer by the satellites to the requesting device has been completed; and
   in response to a determination that the data transfer has not been completed, again identifying the satellites.

4. The system of claim 1, wherein generating the instructions comprises generating instructions that define how the data is to be divided into data portions for delivery by the satellites and the time at which each data portion is to be delivered, wherein a first satellite delivers a first of the data portions to the requesting device at the time, and wherein a second satellite delivers a second of the data portions to the requesting device at the time.

5. The system of claim 1, wherein the data comprises a first instance of data intended for the requesting device and a second instance of data intended for another device, wherein a first satellite delivers the first instance of data to the requesting device at the time, and wherein a second satellite delivers the second instance of data to the another device at the time.

6. The system of claim 5, the first instance of data comprises a first token that is unique to the requesting device, and wherein the second instance of data comprises a second token that is unique to the another device.

7. The system of claim 1, wherein a first satellite delivers the data to the requesting device at the time, and wherein a second satellite delivers the data to another device at the time.

8. A method comprising:
receiving, at a computer comprising a processor, a data request that identifies a requesting device, data to be received by the requesting device or devices controlled by an application, and a time at which the data is to be received by the requesting device;
determining, by the processor, a geographic location of the requesting device and locations of a plurality of satellites;
identifying, by the processor and based on the geographic location of the requesting device and the locations of the plurality of satellites, satellites that are to provide the data to the requesting device;
generating, by the processor, instructions comprising satellite network requirements for the satellites; and
providing, by the processor and to at least one of the satellites, the instructions.

9. The method of claim 8, further comprising:
determining if changes should be made to the satellites that are to provide the data to the requesting device; and
in response to a determination that the changes should be made, updating the geographic location of the requesting device and the locations of the satellites, and identifying the satellites based on an updated geographic location and updated locations.

10. The method of claim 8, further comprising:
determining if a data transfer by the satellites to the requesting device has been completed; and
in response to a determination that the data transfer has not been completed, again identifying the satellites.

11. The method of claim 8, wherein generating the instructions comprises generating instructions that define how the data is to be divided into data portions for delivery by the satellites and the time at which each data portion is to be delivered.

12. The method of claim 11, wherein a first satellite delivers a first portion of the data portions to the requesting device at the time, and wherein a second satellite delivers a second portion of the data portions to the requesting device at the time.

13. The method of claim 8, wherein the data comprises a first instance of data intended for the requesting device and a second instance of data intended for another device, wherein a first satellite delivers the first instance of data to the requesting device at the time, and wherein a second satellite delivers the second instance of data to the another device at the time.

14. The method of claim 8, wherein a first satellite delivers the data to the requesting device at the time, and wherein a second satellite delivers the data to another device at the time.

15. A non-transitory, computer storage medium having computer-executable instructions stored thereon that, when executed by a processor, cause the processor to perform operations comprising:
receiving a data request that identifies a requesting device, data to be received by the requesting device, and a time at which the data is to be received by the requesting device;
determining a geographic location of the requesting device and locations of a plurality of satellites;
identifying, based on the geographic location of the requesting device and the locations of the plurality of satellites, satellites that are to provide the data to the requesting device;
generating instructions comprising satellite network requirements for the satellites; and
providing, to at least one of the satellites, the instructions.

16. The non-transitory, computer storage medium of claim 15, wherein the computer-executable instructions, when executed by the processor, cause the processor to perform operations further comprising:
determining if changes should be made to the satellites that are to provide the data to the requesting device; and
in response to a determination that the changes should be made, updating the geographic location of the requesting device and the locations of the satellites, and identifying the satellites based on an updated geographic location and updated locations.

17. The non-transitory, computer storage medium of claim 15, wherein the computer-executable instructions, when executed by the processor, cause the processor to perform operations further comprising:
determining if a data transfer by the satellites to the requesting device has been completed; and
in response to a determination that the data transfer has not been completed, again identifying the satellites.

18. The non-transitory, computer storage medium of claim 15, wherein generating the instructions comprises generating instructions that define how the data is to be divided into data portions for delivery by the satellites and the time at which each data portion is to be delivered, wherein a first satellite delivers a first of the data portions to the requesting device at the time, and wherein a second satellite delivers a second of the data portions to the requesting device at the time.

19. The non-transitory, computer storage medium of claim 15, wherein the data comprises a first instance of data intended for the requesting device and a second instance of data intended for another device, wherein a first satellite delivers the first instance of data to the requesting device at the time, and wherein a second satellite delivers the second instance of data to the another device at the time.

20. The non-transitory, computer storage medium of claim 15, wherein a first satellite delivers the data to the requesting device at the time, and wherein a second satellite delivers the data to another device at the time.

* * * * *